(12) United States Patent
Yamamoto et al.

(10) Patent No.: US 6,820,909 B2
(45) Date of Patent: Nov. 23, 2004

(54) ARTICLE STORAGE APPARATUS FOR VEHICLES

(75) Inventors: Kaoru Yamamoto, Saitama (JP); Tomoyuki Maruyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/400,650

(22) Filed: Mar. 28, 2003

(65) Prior Publication Data

US 2003/0222473 A1 Dec. 4, 2003

(30) Foreign Application Priority Data

Mar. 29, 2002 (JP) ........................................ 2002-094759

(51) Int. Cl.⁷ ................................................ B60R 7/00
(52) U.S. Cl. ..................................... 296/37.1; 296/78.1
(58) Field of Search ............................. 296/37.1, 78.1, 296/37.8; 224/277

(56) References Cited

U.S. PATENT DOCUMENTS

| | | | |
|---|---|---|---|
| 1,322,188 A | * | 11/1919 | Henry ........................ 40/649 |
| 1,580,262 A | * | 4/1926 | McMenemy ................ 224/483 |
| 4,949,484 A | * | 8/1990 | Finger ......................... 40/359 |
| 5,172,306 A | * | 12/1992 | Cantrell ...................... 361/802 |

FOREIGN PATENT DOCUMENTS

| | | | | |
|---|---|---|---|---|
| DE | 2017937 | * | 10/1971 | ................ 296/37.8 |
| JP | 06-156344 A | | 6/1994 | |
| JP | 2000-016183 A | | 1/2000 | |

* cited by examiner

*Primary Examiner*—Dennis H. Pedder
(74) *Attorney, Agent, or Firm*—Birch, Stewart, Kolasch & Birch, LLP (57) ABSTRACT

To enable a card of a predetermined size to be adequately stored in an article storage box so as to be capable of easily being inserted and withdrawn, and to enable the internal space of the article storage box to be suitably partitioned by a partitioning plate instead of the above-described card. The inner wall of the article storage box to be mounted on a vehicle is formed with grooves in which a card of a predetermined size can be inserted so as to be capable of being inserted and withdrawn, and the internal space of the article storage box is partitioned by at least a part of the card in a state of being inserted into the grooves.

20 Claims, 6 Drawing Sheets

ARTICLE STORAGE APPARATUS FOR VEHICLES

CROSS-REFERENCE TO RELATED APPLICATIONS

The present nonprovisional application claims priority under 35 USC 119 to Japanese Patent Application No. 2002-094759 filed on Mar. 29, 2002 the entire contents thereof is hereby incorporated by reference.

BACKGROUND OF THE INVENTION

1. Field of the Invention

The present invention relates to an article storage apparatus for a vehicle.

2. Description of Background Art

Hithertofore, an article storage box with a partitioning plate provided on the inner wall of the article storage box and adapted to be mounted on a vehicle is disclosed in JP-A-6-156344. The internal space of the article storage box is partitioned by the partitioning plate so as to improve storage performance.

The technology in which a card-specific holder is provided in the article storage box to be mounted on the vehicle has also already proposed, for example, as set forth in JP-A-2000-16183.

In the article storage box for a vehicle described above, it is desired that cards of a predetermined size such as credit cards and the like may be held suitably without rattling. In addition, the cards should be stored so as to be easy to be inserted and withdrawn. Further, the internal space of the article storage box may be partitioned by the partitioning plates so that the internal space can be multi-functionally and effectively utilized when it is not necessary to store the cards.

SUMMARY AND OBJECTS OF THE INVENTION

In view of such circumstances, it is an object of the present invention to provide an article storage apparatus for a vehicle that can satisfy the above-described requirements in a simple structure.

In order to achieve the object described above, the present invention provides an article storage box that is mounted on the vehicle and is formed with grooves in which a card of a predetermined size may be retrievably inserted on the inner wall thereof. The internal space of the article storage box is partitioned by at least a part of the card in a state of being inserted into the grooves. According to such characteristics, the card of the predetermined size may easily be stored in an adequate manner in the article storage box so as to be capable of being inserted and withdrawn. Alternatively, when the partitioning plate of the same size as the card is used, and inserted and held into the grooves instead of the above-described card, the internal space in the article storage box may be suitably partitioned, which improves the storage performance of the storage box, and enables the storage box to be used multi-functionally.

The present invention provides a article storage box that is installed in the front cowl of the motorcycle. According to such characteristics, a driver of the motorcycle can take the card of a predetermined size in and out from the article storage box.

The present invention provides a vibration preventing device for preventing vibrations of the card in a state of being inserted into the grooves is provided. According to such characteristics, the card may be adequately held in the article storage box without rattling.

The present invention provides a vibration preventing device that is constructed of a projection projecting from the inner wall of the article storage box for pressing the central portion of the card.

The present invention provides a projection that is constructed of a rib formed by raising the inner wall of the article storage box so as to extend along the direction of insertion of the card into the grooves. According to the respective characteristics, the card itself is somewhat deformed resiliently by the pressure to prevent vibrations of the card easily and effectively. Moreover, since the vibration preventing device may be integrated with the inner wall of the storage box an increase in the number of components may be avoided.

The present invention provides a bottom for the article storage box that has a step. A pair of engaging rib portions, constituting the grooves in cooperation with the vertical wall portion of the step, are formed on the inner wall of the article storage box so that a portion of the card in a state of being inserted into the grooves wraps over the vertical wall portion. The projection is formed on the surface of the vertical wall portion between the pair of engaging rib portions. According to such characteristics, the card storage and holding portion may easily be formed by utilizing the step (vertical wall portion) on the bottom of the article storage box.

The present invention provides the rib, the vertical wall, and the engaging rib portion are different in height of the upper ends thereof. According to such a characteristics, inserting and withdrawing the card may further be facilitated.

The present invention provides an article storage box including an opening to be opened and closed by a lid that can be locked. According to such a characteristics, even when a valuable card is stored in the article storage box, its security is ensured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the examples of the present invention shown in the attached drawings, an embodiment of the present invention will be described in detail below.

Figure 1:
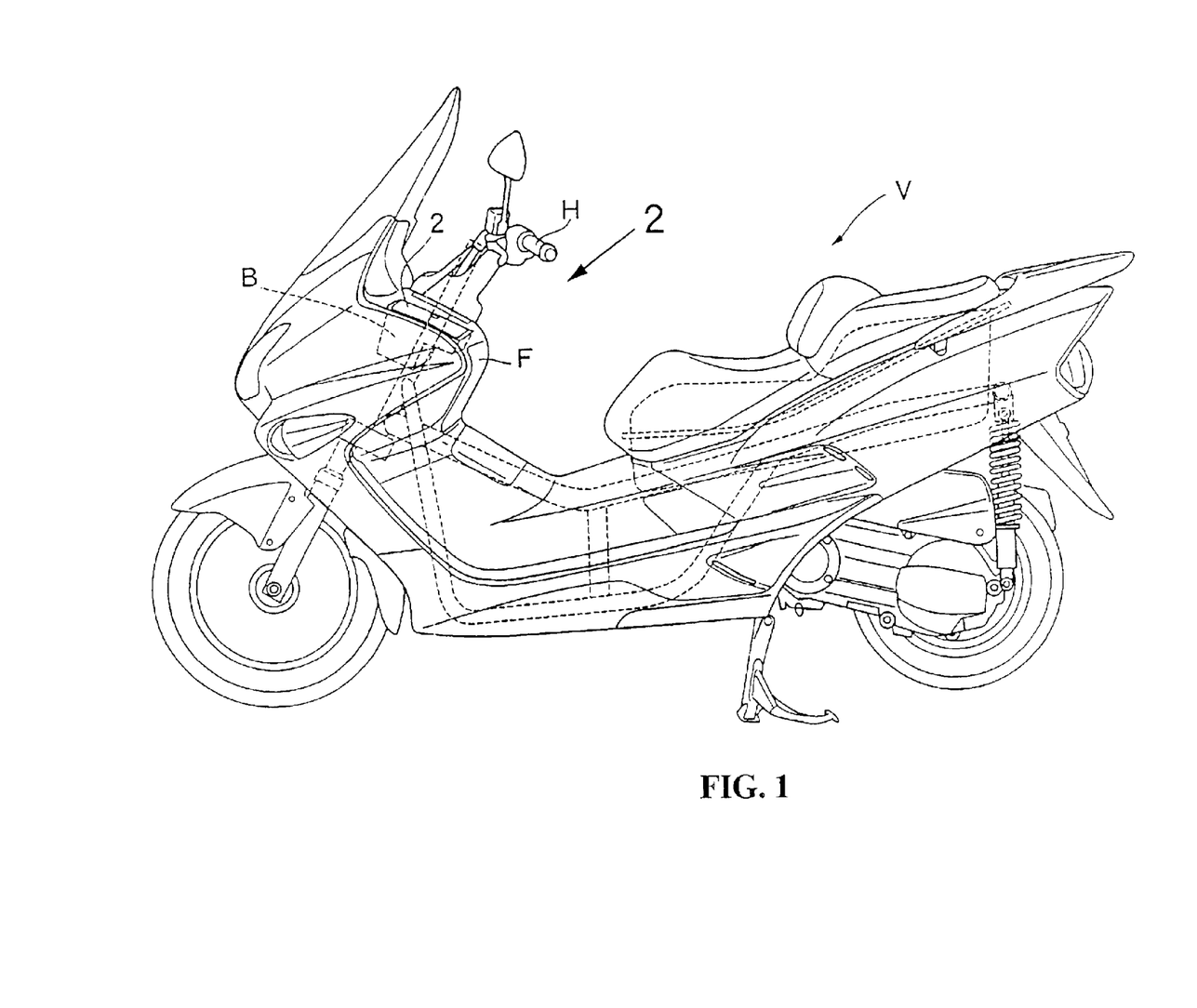
FIG. 1 is a general side view of a motorcycle.
Figure 2:
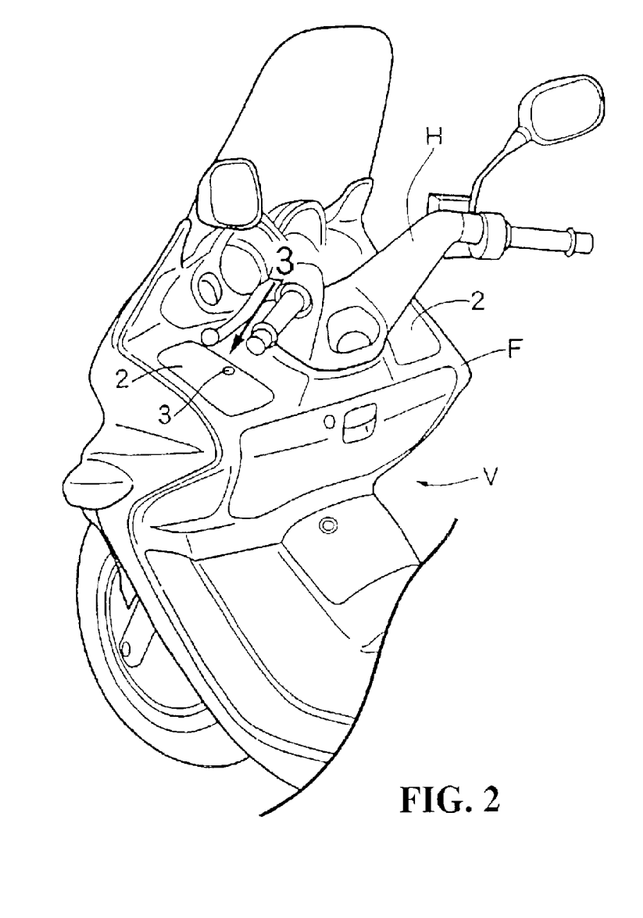
FIG. 2 is a drawing of a part indicated by an arrow 2 in FIG. 1.
Figure 3:
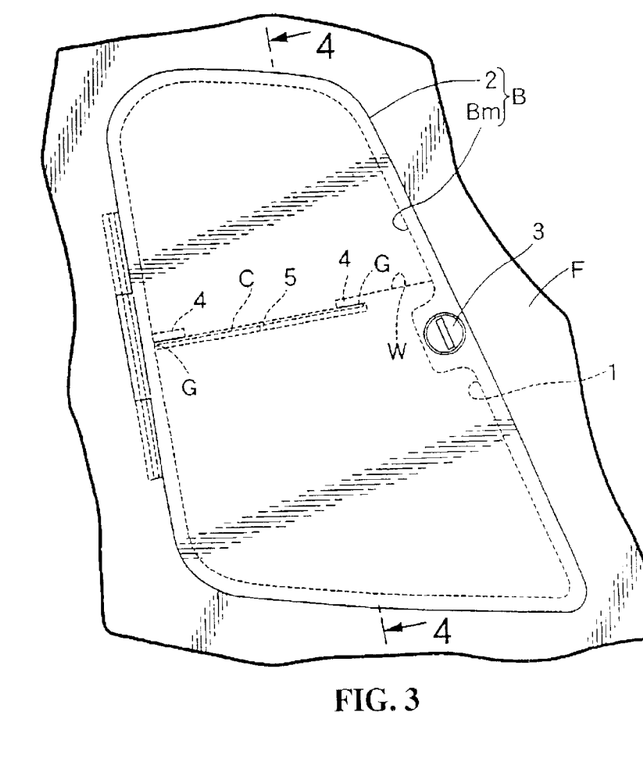
FIG. 3 is an enlarged view showing a part indicated by an arrow 3 in FIG. 2.
Figure 4:
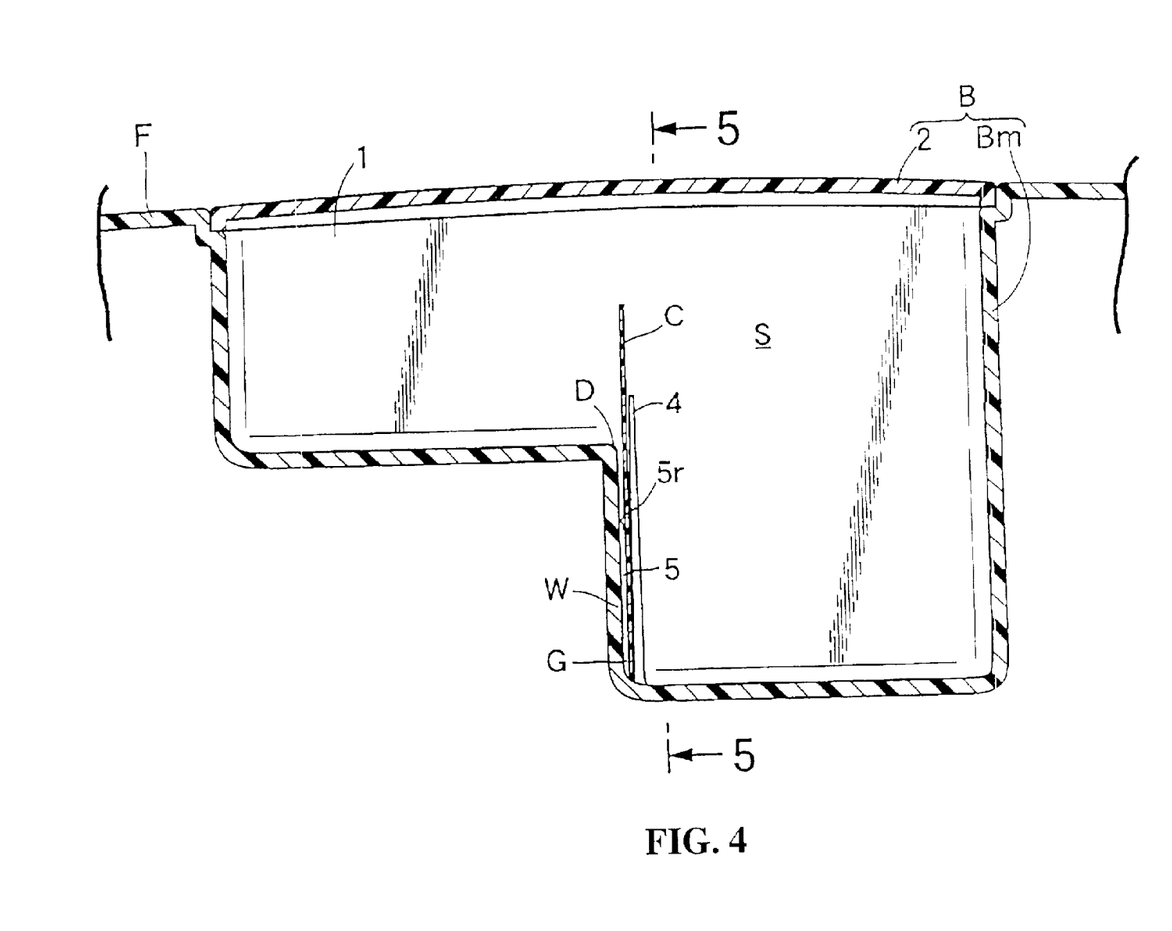
FIG. 4 is a cross sectional view taken along the line 4—4 in FIG. 3.

A front cowl F of a motorcycle V is provided with an article storage box B on at least one (both in the example shown in the FIG. 2) of the left and right sides of a steering handle H. The article storage box B includes a box body Bm formed integrally with the front cowl F, and a lid 2 hinged to the box body Bm for opening and closing an opening 1 on top of the box body Bm. Between the lid 2 and the box body Bm, there is provided a locking unit 3 that can lock the lid 2 as needed.

Figure 5:
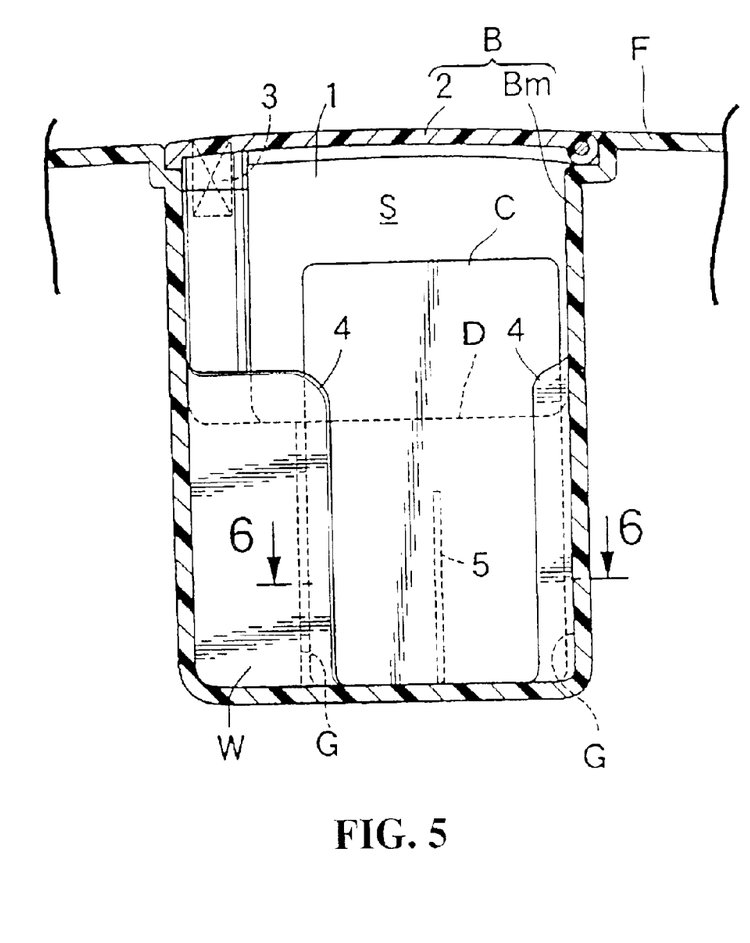
FIG. 5 is a cross sectional view taken along the line 5—5 in FIG. 4.
Figure 6:
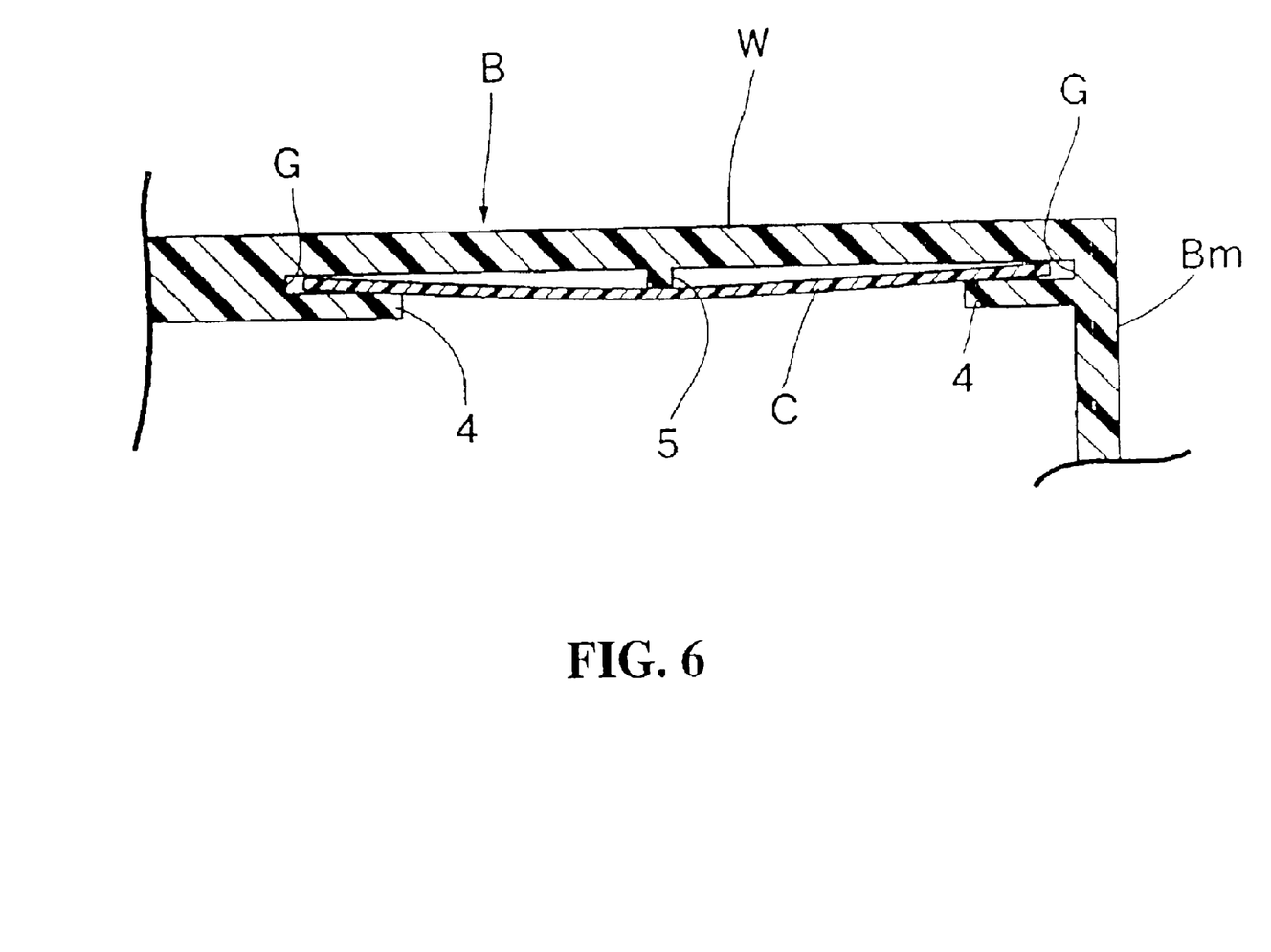
FIG. 6 is an enlarged cross sectional view taken along the line 6—6 in FIG. 5.

In the example as shown in the FIG. 5, the box body Bm is formed on its inner wall with a pair of left and right grooves G in which a card C of a predetermined size, which is the size of the credit card which is in widespread use, may be retrievably inserted and held. These grooves G have openings opposed with each other, and adapted in such a manner that the upper portion of the card C or a partitioning plate (not shown) formed into the substantially same size with the card in a state of being inserted and held in the grooves G partitions at least a part of an inner space S, which is used as a luggage compartment, of the article storage box B, into the front portion and the rear portion.

The bottom of the box body Bm is formed with a step D for avoiding interference with other vehicle accessories. A vertical wall portion W of the step D is flat and extends in substantially a vertical direction. A pair of engaging rib portions 4, which constitutes the grooves G in cooperation with the vertical wall portion W are formed integrally with the inner wall of the box body Bm. Especially in the example shown in FIG. 5, one of the engaging ribs 4 is formed on the vertical wall portion W and the other engaging rib 4 is formed on the peripheral wall of the box body Bm in the vicinity of the vertical wall portion W, respectively. The surface of the vertical wall portion W between the pair of engaging ribs 4 is raised and integrally formed with a vertical rib 5 extending in the vertical direction.

The vertical rib 5 functions as a projection (and thus as a vibration preventing device of the present invention) pressing the central portion of the card C in a state of being inserted and held in the grooves G. In the example shown in FIG. 5, the vertical rib 5 is formed along the direction of the insertion of the card C into the grooves G, or so as to extend in the vertical direction. In addition, the upper end portion of the vertical rib 5 is formed to have an arcuate surface 5r so as to prevent the edge of the card C from being caught.

Therefore, at least the lower portion of the card C or the partitioning plate is wrapping over the vertical wall portion W in a state of being inserted and held in the grooves G, so that the card C does not interfere with the storage of other articles.

In the example shown in FIGS. 3–6, the height of the upper end of the vertical rib 5 is lower than that of the vertical wall portion W and the height of the upper end of the engaging crib portion 4 is higher than that of the same vertical wall, portion W. Therefore, when inserting and withdrawing the card C or the partitioning plate, the card C or the partitioning plate can easily be grasped and can easily be inserted into the grooves G.

Consequently, the operation of taking in and out is facilitated as a whole.

Subsequently, the action of the embodiment will be described. In the case of storing the card C of a predetermined size such as a credit card, which has widespread use, into the article storage box B, the lid 2 is opened first to open the opening 1 of the box body Bm. In this state, the above-described card C is inserted into the left and the right grooves G along the vertical wall portion W of the step D on the bottom of the article storage box B, so that the card C is adequately and retrievably stored in the storage box B.

In this case, the vertical rib 5 as a vibration preventing device (projection) for the card C is formed on the surface of the vertical wall W so as to extend along the direction of insertion of the card into the grooves G, and presses the central portion of the card C that is engaged in the left and right grooves G on both sides. Therefore, the card C itself is somewhat deformed resiliently by this pressure to prevent vibrations of the card C easily and effectively. Moreover, since the vibration preventing device for the card C may be integrated with the inner wall of the storage box B, an increase in the number of components may be avoided. Thus, simplification of the structure and a cost saving are achieved.

On the other hand, when the above-described card C is not to be stored, a partitioning plate fabricated in advance instead of the card C and formed to be the same size as the credit card is inserted and held in the grooves G in the same manner as in the case of the card C. By utilizing such a partitioning plate, the upper portion of the partitioning plate partitions the internal space S of the article storage box B into the front portion and the rear portion. This partitioning effect improves the storage performance of the storage box B and thus a multi-functional usage is achieved.

Since the opening 1 of the article storage box B is opened and closed by the lid 2 that can be locked, even when a valuable card C is stored in the storage box B, the security is ensured.

Although the embodiment of the present invention has been described in detail thus far, the present invention is not limited thereto, and various modifications in design may be applied. For example, although the box body Bm of the article storage box B is integrated with the front cowl F in the embodiment, the box body Bm may be formed separately from the front cowl F and attached later.

Although one of the pair of engaging rib portions 4 constituting the grooves G in cooperation with the vertical wall, portion W of the step D on the bottom of the article storage box B is formed on the vertical wall portion W, and the other one is formed on the peripheral wall of the box body Bm in the vicinity of the vertical wall portion W, respectively, in the embodiment, it is also possible to form both of the pair of engaging rib portions 4 on the vertical wall portion W or to form both of them on the peripheral wall of the box body Bm in the vicinity of the vertical wall portion W.

As described above, according to the present invention, since the article storage box to be mounted on the vehicle is formed with grooves in which a card of a predetermined size may be retrievably inserted on the inner wall thereof, and the internal space of the article storage box is partitioned by at least a part of the card in a state of being inserted into the grooves, the card of the predetermined size may easily be stored adequately in the article storage box so as to be capable of being inserted and withdrawn easily. Alternatively, by using the partitioning plate of the same size as the card, and inserting and holding the same into the grooves instead of the above-described card, the internal space in the article storage box may be suitably partitioned, which improves the storage performance of the storage box, and enables the same to be used multi-functionally.

Especially, according to the present invention, since the article storage box is installed in the front cowl of the motorcycle, a driver of the motorcycle can easily take the card of a predetermined size in and from the article storage box.

Especially, according to the present invention, since a vibration preventing device for preventing vibrations of the card in a state of being inserted into the grooves is provided, the card may be adequately held without rattling and reliable maintenance and management of the card is ensured.

Especially, according to the present invention, the vibration preventing device is constructed of a projection or a rib projecting from the inner wall of the article storage boat for pressing the central portion of the card, the card itself is somewhat deformed resiliently by the pressure to easily and effectively prevent vibrations of the card. Moreover, since the vibration preventing device may be integrated with the inner wall of the storage box, an increase in the number of components may be avoided and simplification of the structure and cost savings are achieve.

Especially, according to the present invention, since the bottom of the article storage box has a step, and a pair of engaging rib portions constituting the groove in cooperation with the vertical wall portion of the step are formed on the inner wall of the article storage box so that at least a portion of the card in a state of being inserted into the grooves wraps over the vertical wall portion, and the projection is formed on the surface of the vertical wall portion between the pair of engaging rib portions, the card storage and holding portion may easily be formed by utilizing the step on the bottom of the article storage box.

Especially, according to the present invention, since the rib, the vertical wall, and the engaging rib portion are different in height on the upper ends thereof, inserting and withdrawing the card may be further facilitated.

Especially, according to the present invention, since the article storage box includes an opening to be opened and closed by a lid wherein the lid may be locked, even when a precious card is stored in the article storage box, its security is ensured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An article storage apparatus for a vehicle, comprising:
   an article storage box for mounting on a vehicle, the article storage box having two bottom sections at different levels and separated by an inner wall extending vertically between the two bottom sections;
   grooves being formed within the article storage box in which a card of a predetermined size may be retrievably inserted relative to the inner wall; and
   an internal space of said article storage box is partitioned by at least a part of said card in a state of being inserted into the grooves.

2. The article storage apparatus for a vehicle according to the claim 1, wherein said article storage box is installed in a front cowl of a motorcycle.

3. The article storage apparatus for a vehicle according to claim 1, and further including a vibration preventing device for preventing vibrations of said card in a state when inserted into said grooves.

4. The article storage apparatus for a vehicle according to claim 2, and further including a vibration preventing device for preventing vibrations of said card in a state when inserted into said grooves.

5. The article storage apparatus for a vehicle according to claim 3, wherein said vibration preventing device is a projection projecting from the inner wall of said article storage box for pressing the central portion of said card.

6. The article storage apparatus for a vehicle according to claim 4, wherein said vibration preventing device is a projection projecting from the inner wall of said article storage box for pressing the central portion of said card.

7. The article storage apparatus for a vehicle according to claim 5, wherein said projection is constructed of a rib formed by raising the inner wall of said article storage box so as to extend along the direction of insertion of said card into said grooves.

8. The article storage apparatus for a vehicle according to claim 6, wherein said projection is constructed of a rib formed by raising the inner wall of said article storage box so as to extend along the direction of insertion of said card into said grooves.

9. The article storage apparatus for a vehicle according to claim 7,
   wherein a pair of engaging rib portions constituting said grooves are formed on the inner wall of said article storage box so that a portion of said card in a state of being inserted into the grooves wraps over said inner wall, and
   wherein said projection is formed on the surface of said inner wall between said pair of engaging rib portions.

10. The article storage apparatus for a vehicle according to claim 8,
    wherein a pair of engaging rib portions constituting said grooves are formed on the inner wall of said article storage box so that a portion of said card in a state of being inserted into the grooves wraps over said inner wall, and
    wherein said projection is formed on the surface of said inner wall between said pair of engaging rib portions.

11. The article storage apparatus for a vehicle according to claim 9, wherein said rib, said inner wall, and said engaging rib portion are different in height on the upper ends thereof.

12. The article storage apparatus for a vehicle according to claim 10, wherein said rib, said inner wall, and said engaging rib portion are different in height on the upper ends thereof.

13. The article storage apparatus for a vehicle according to claim 1, wherein said article storage box includes an opening to be opened and closed by a lid wherein the lid can be locked.

14. The article storage apparatus for a vehicle according to claim 2, wherein said article storage box includes an opening to be opened and closed by a lid wherein the lid can be locked.

15. The article storage apparatus for a vehicle according to claim 3, wherein said article storage box includes an opening to be opened and closed by a lid wherein the lid can be locked.

16. An article storage apparatus for a vehicle, comprising:
    an article storage box for mounting on a vehicle, said article storage box including two bottom sections at different levels and separated by an inner wall extending vertically between the two bottom sections, upwardly projecting side walls and a lid;
    at least one groove being formed within the article storage box, said at least one groove being adapted to accommodate a card of a predetermined size for insertion and withdrawal of the card relative to the groove in the article storage box; and an internal space of said article storage box is partitioned by at least a part of said card when the card is inserted into the at least one groove.

17. The article storage apparatus for a vehicle according to the claim 16, wherein said article storage box is installed in a front cowl of a motorcycle.

18. The article storage apparatus for a vehicle according to claim 16, and further including a vibration preventing device for preventing vibrations of said card when inserted into said grooves.

19. The article storage apparatus for a vehicle according to claim 17, and further including a vibration preventing device for preventing vibrations of said card in a state when inserted into said grooves.

20. The article storage apparatus for a vehicle according to claim 18, wherein said vibration preventing device is a projection projecting from the inner wall of said article storage box for pressing the central portion of said card.

* * * * *